United States Patent
Chang et al.

(10) Patent No.: US 7,554,355 B2
(45) Date of Patent: Jun. 30, 2009

(54) CROSSBAR SWITCH ARCHITECTURE FOR MULTI-PROCESSOR SOC PLATFORM

(75) Inventors: June Young Chang, Daejeon (KR); Han Jin Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 47 days.

(21) Appl. No.: 11/607,515

(22) Filed: Dec. 1, 2006

(65) Prior Publication Data

US 2007/0126474 A1 Jun. 7, 2007

(30) Foreign Application Priority Data

Dec. 7, 2005 (KR) .................. 10-2005-0119055
Aug. 7, 2006 (KR) .................. 10-2006-0074086

(51) Int. Cl.
*H04L 12/50* (2006.01)
*H03K 17/00* (2006.01)

(52) U.S. Cl. .................. 326/38; 370/375; 327/403; 327/407; 327/415

(58) Field of Classification Search .................. 326/38; 370/375; 327/403, 407, 415
See application file for complete search history.

(56) References Cited

U.S. PATENT DOCUMENTS

| | | | |
|---|---|---|---|
| 4,968,977 A | 11/1990 | Chinnaswamy et al. | |
| 5,111,431 A | 5/1992 | Garde | |
| 5,877,636 A * | 3/1999 | Truong et al. | 327/99 |
| 5,982,309 A * | 11/1999 | Xi et al. | 341/101 |
| 6,487,171 B1 | 11/2002 | Honig et al. | |
| 6,501,757 B1 | 12/2002 | Kamaraj et al. | |

FOREIGN PATENT DOCUMENTS

| | | |
|---|---|---|
| JP | 64-082161 | 3/1989 |
| JP | 2000-200258 | 7/2000 |
| KR | 10-2005-0079458 | 8/2005 |
| KR | 10-2005-0092632 | 9/2005 |
| KR | 1020050092632 | 9/2005 |
| WO | WO 01-050777 | 7/2001 |

OTHER PUBLICATIONS

Korean Notice of Patent Grant dated Feb. 29, 2008 for the corresponding KR 10-2006-0074086.
Ryu, K., et al., "A Comparison of Five Different Multiprocessor SoC Bus Architectures."

* cited by examiner

*Primary Examiner*—Rexford N Barnie
*Assistant Examiner*—Thienvu V Tran
(74) *Attorney, Agent, or Firm*—Ladas & Parry LLP

(57) ABSTRACT

Provided is a crossbar switch architecture appropriate to a multi-processor system-on-a-chip (SoC) platform including a plurality of masters and slaves, capable of high-speed data transfer, allowing the number of masters or slaves therein to be easily increased, and having a simple control structure. The crossbar switch architecture includes 2×1 multiplexers connected in a matrix form consisting of rows and columns. The 2×1 multiplexers each have one input line connected with an output line of a multiplexer at a front column of the same row, and the other input line connected with an input/output line of a column including the corresponding multiplexer, and an output line of a multiplexer at the last column of each row is connected with an input/output line of the row.

9 Claims, 7 Drawing Sheets

MULTI-PROCESSOR SoC PLATFORM HAVING SINGLE BUS ARCHITECTURE

MULTI-PROCESSOR SoC PLATFORM HAVING MULTI-BUS ARCHITECTURE 170

2×2 MULTIPLEXER

2×1 MULTIPLEXER

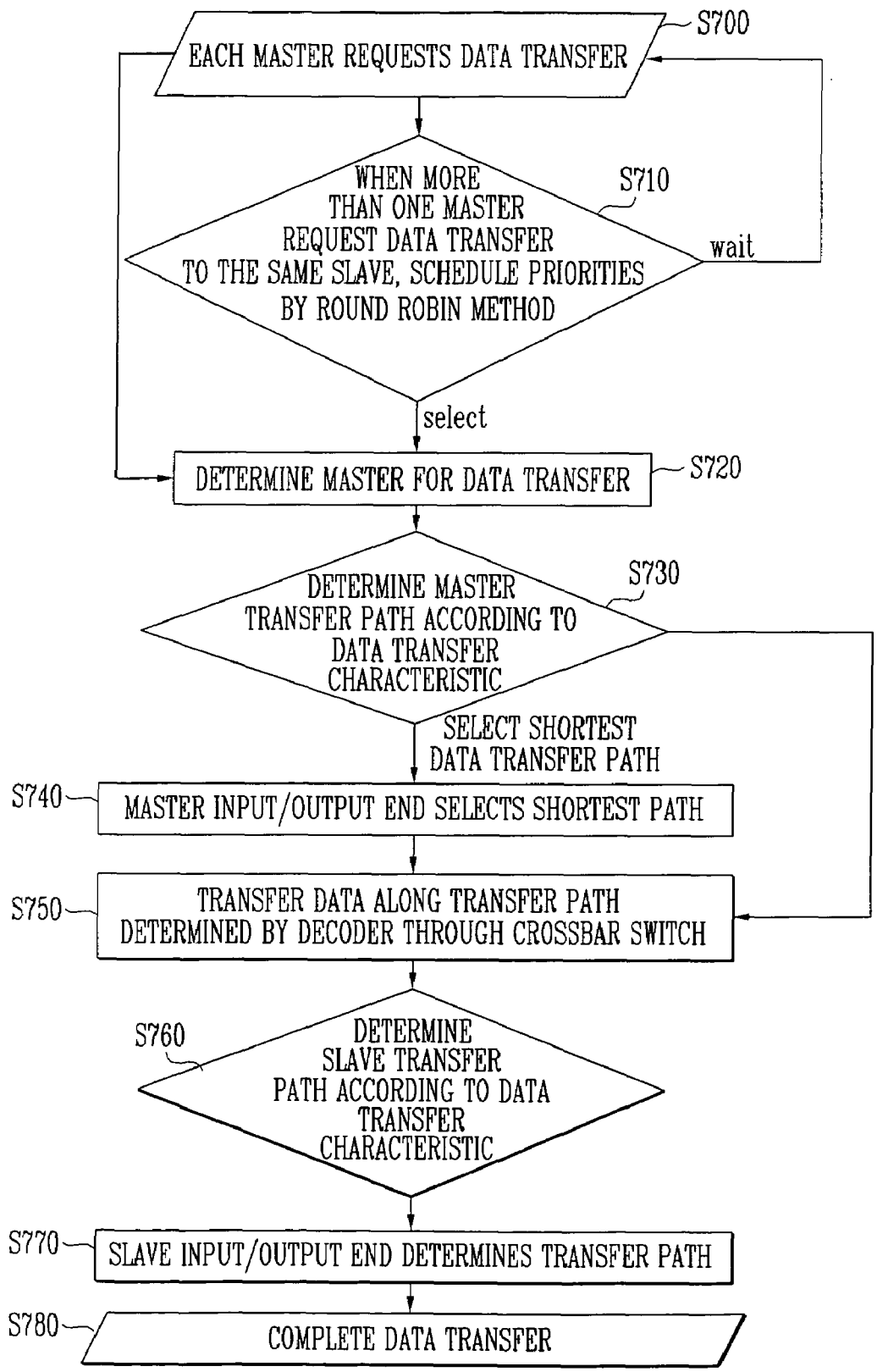

CROSSBAR SWITCH ARCHITECTURE FOR MULTI-PROCESSOR SOC PLATFORM

CROSS-REFERENCE TO RELATED APPLICATION

This application claims priority to and the benefit of Korean Patent Application Nos. 2005-119055, filed Dec. 7, 2005, and 2006-74086, filed Aug. 7, 2006, the disclosures of which are incorporated herein by reference in their entirety.

BACKGROUND

1. Field of the Invention

The present invention relates to a crossbar switch architecture appropriate to a multi-processor system-on-a-chip (SoC) platform including a plurality of masters and slaves, capable of high-speed data transfer, allowing the number of masters or slaves therein to be easily increased, and having a simple control structure.

2. Discussion of Related Art

In current SoC design, a platform-based design method is used to solve a productivity problem in chip design and increase reuse of intellectual property (IP). In order to construct SoC platforms, data communication architectures of various forms serving as frames of the platforms have been disclosed. A SoC platform is a basic template for SoC design, having a structure in which a processor, a memory and peripherals are coupled to an on-chip bus. An AMBA bus architecture, which is the most typical on-chip bus architecture, includes Advanced System Bus (ASB)/Advanced Peripheral Bus (APB) using a single bus architecture, multi-layer Advanced High Performance Bus (AHB)/APB using AHB and a multi-bus architecture, and so on.

FIG. 1A illustrates a SoC platform having a single bus architecture in which an ASB/AHB system bus 110, which is an on-chip bus, connects a processor 100 having 4 masters with a slave hardware module 130 such as IP or a shared memory. The on-chip bus architecture having the single bus has a drawback in that when a master M0 uses the AHB bus, another master M1 cannot use the AHB bus, data communication is delayed, and thus overall performance is lowered.

In order to solve this problem, a SoC platform having a multi-bus architecture as illustrated in FIG. 1B has been provided. The architecture uses a busmatrix 150 serving as a switch for connecting each AHB bus with another AHB bus. While a master M0 in one unit block 140 transfers data to a slave S1, a master M2 in another unit block 160 can transfer data to a slave S2, and a master M3 in yet another unit block 170 can transfer data to a slave S4.

However, while the master M0 in unit block 140 uses an AHB1 bus and an AHB3 bus to transfer data to the slave S4 in unit block 170, a master M1 and master M3 cannot use the AHB1 bus and the AHB3 bus. Therefore, data delay is caused in the multi-bus architecture and throughput is restricted. Consequently, in order to solve this problem, a data communication architecture and data transfer method appropriate to a multi-processor SoC system comprising a plurality of processors are in demand.

To this end, an on-chip network architecture has been suggested that uses an M×N crossbar switch used in computer communication as a SoC bus architecture. By using a crossbar switch instead of an on-chip bus, parallel data communication is allowed, so that system performance can be improved by transferring data at high speed without data transfer delay.

FIG. 2 illustrates a multi-processor SoC platform architecture in which 4 masters M0 201 to M3 204 and 4 slaves S0 206 to S3 209 are connected by four 4×1 multiplexers. A controller 205 manages functions of an arbiter for mediating requests of the masters, an address decoder for connecting masters with slaves, and so on. Therefore, data is not Simultaneously transferred from masters M0 201 and M1 202 to the slave S0 206 instead, transfer is performed by the arbiter in order of priority of masters, and a slave is selected by the address decoder. In this architecture, simultaneous data transfer from M0 to S0 and from M1 to S3 is possible.

There are transfer paths from M0 201 to all the slaves S0 206 to S3 209, and data is transferred through one multiplexer. In addition, data transfer from the slave S0 206 to all of the masters M0 201 to M3 204 is possible. The multiplexers used in the crossbar switch are master M×1 multiplexers and there should be as many of them as there are slaves S. In this architecture including 4 masters and 4 slaves, eight 4×1 multiplexers are needed. Also, there is a data path from each master to each slave, and data transfer from a master to a slave is possible through only one multiplexer.

In the illustrated architecture, high-speed parallel data transfer is possible using a crossbar switch. However, when the number of masters or slaves increases, the multiplexer structure of each master or slave must be changed. For example, when one master is added, the 4×1 multiplexers 210 to 213 connected to each slave must be changed into 5×1 multiplexers. In addition, the number of control bits transferred from the controller to the multiplexers increases from 2 bits to 3 bits, and thus the controller becomes complicated. Thus, increase in the number of masters or slaves, i.e., expandability, is restricted. Consequently, in this architecture frequently used in on-chip network architectures, high-speed data transfer is possible, but it is difficult to add masters/slaves.

SUMMARY OF THE INVENTION

The present invention is directed to a crossbar switch architecture having excellent expandability.

The present invention is also directed to a crossbar switch architecture capable of high-speed parallel data transfer and solving the problems of complex control structure and difficulty in expansion caused when the number of masters or slaves increases in a high-speed parallel data transfer architecture of a general crossbar switch.

The present invention is also directed to a crossbar switch architecture capable of solving the problem of performance deterioration due to data transfer delay caused by using a shared bus.

One aspect of the present invention provides a crossbar switch architecture comprising 2×2 multiplexers connected in a matrix form consisting of rows and columns, wherein the 2×2 multiplexers each have one input line connected with an output line of a multiplexer at a front column of the same row, the other input line connected with an output line of a multiplexer at a front row of the same column or an input/output line of a column including the corresponding multiplexer, and an output line of a multiplexer at the last column of each row is connected with an input/output line of the row.

Another aspect of the present invention provides a crossbar switch architecture comprising 2×1 multiplexers connected in a matrix form consisting of rows and columns, wherein the 2×1 multiplexers each have one input line connected with an output line of a multiplexer at a front column of the same row, the other input line connected with an input/output line of a column including the corresponding multiplexer, and an output line of a multiplexer at the last column of each row is connected with an input/output line of the row.

In particular, the present invention provides a matrix-form crossbar switch architecture to be applied to a multi-processor system-on-a-chip (SoC) platform comprising a plurality of masters and slaves, wherein an input/output line of each column of the matrix may be connected with a master device such as a processing unit, and an input/output line of each row of the matrix may be connected with a slave device such as a peripheral interface.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 7 is a flowchart showing a data transfer process in the multi-processor SoC platform of FIG. 5.

DETAILED DESCRIPTION OF EXEMPLARY EMBODIMENTS

Hereinafter, exemplary embodiments of the present invention will be described in detail. However, the present invention is not limited to the exemplary embodiments disclosed below and can be implemented in various forms. Therefore, the present exemplary embodiments are provided for complete disclosure of the present invention and to fully convey the scope of the present invention to those of ordinary skill in the art.

For example, terminals of various multiplexers in the exemplary embodiments below are clearly illustrated, classified and described as input terminals and output terminals. However, considering use and characteristics of multiplexers forming a data input/output path regardless of transfer direction, it is obvious that the input terminals and output terminals are classified as such for convenience and could be switched with each other. Alternatively, bidirectional data transfer through the multiplexers is also possible.

First Exemplary Embodiment

Figure 1A:
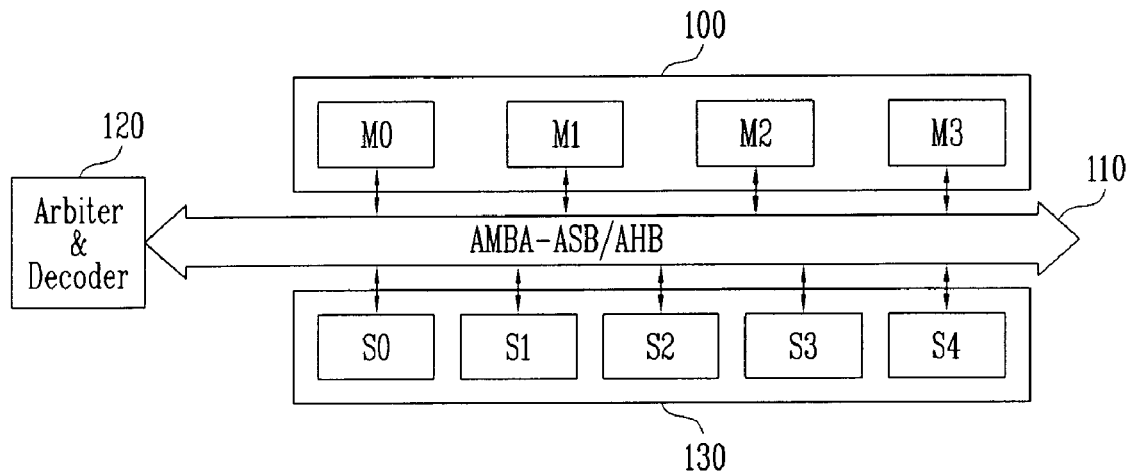
FIG. 1A is a block diagram of a system-on-a-chip (SoC) platform having a single bus architecture according to conventional art.
Figure 1B:
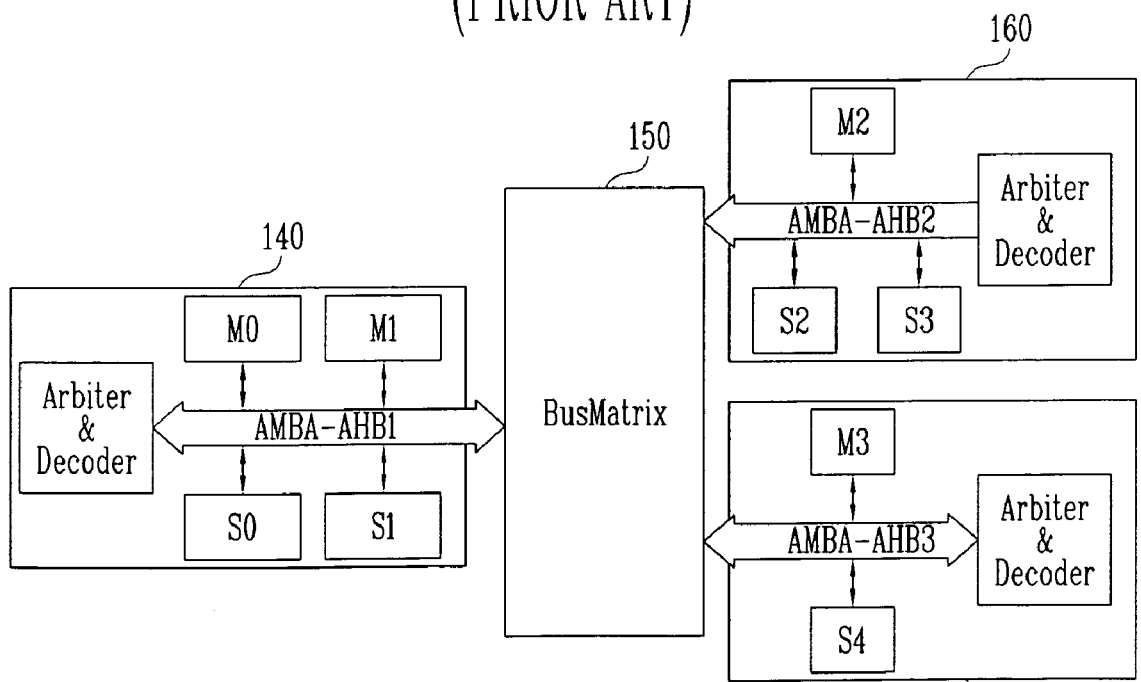
FIG. 1B is a block diagram of a SoC platform having a multiple-bus architecture according to conventional art.
Figure 2:
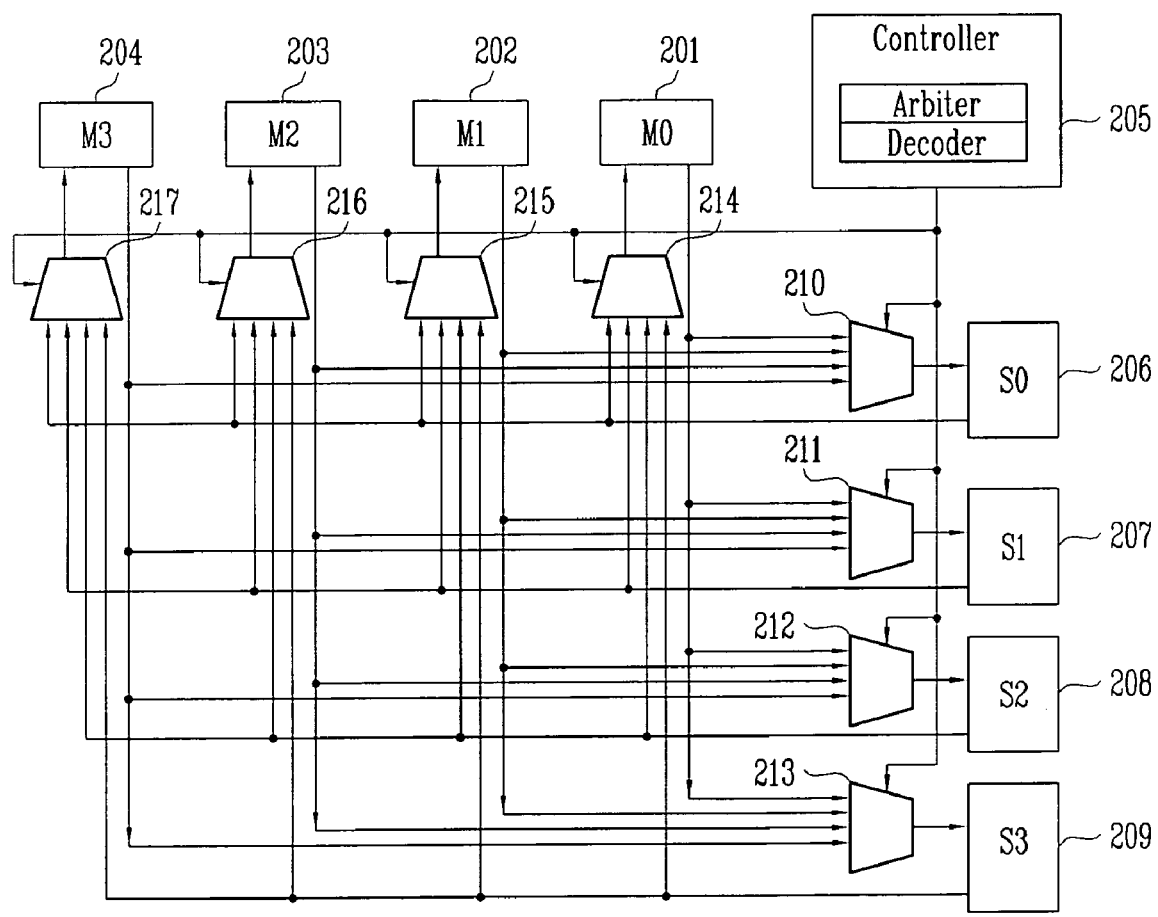
FIG. 2 is a block diagram of a multi-processor SoC platform using a crossbar switch according to conventional art.
Figure 3A:
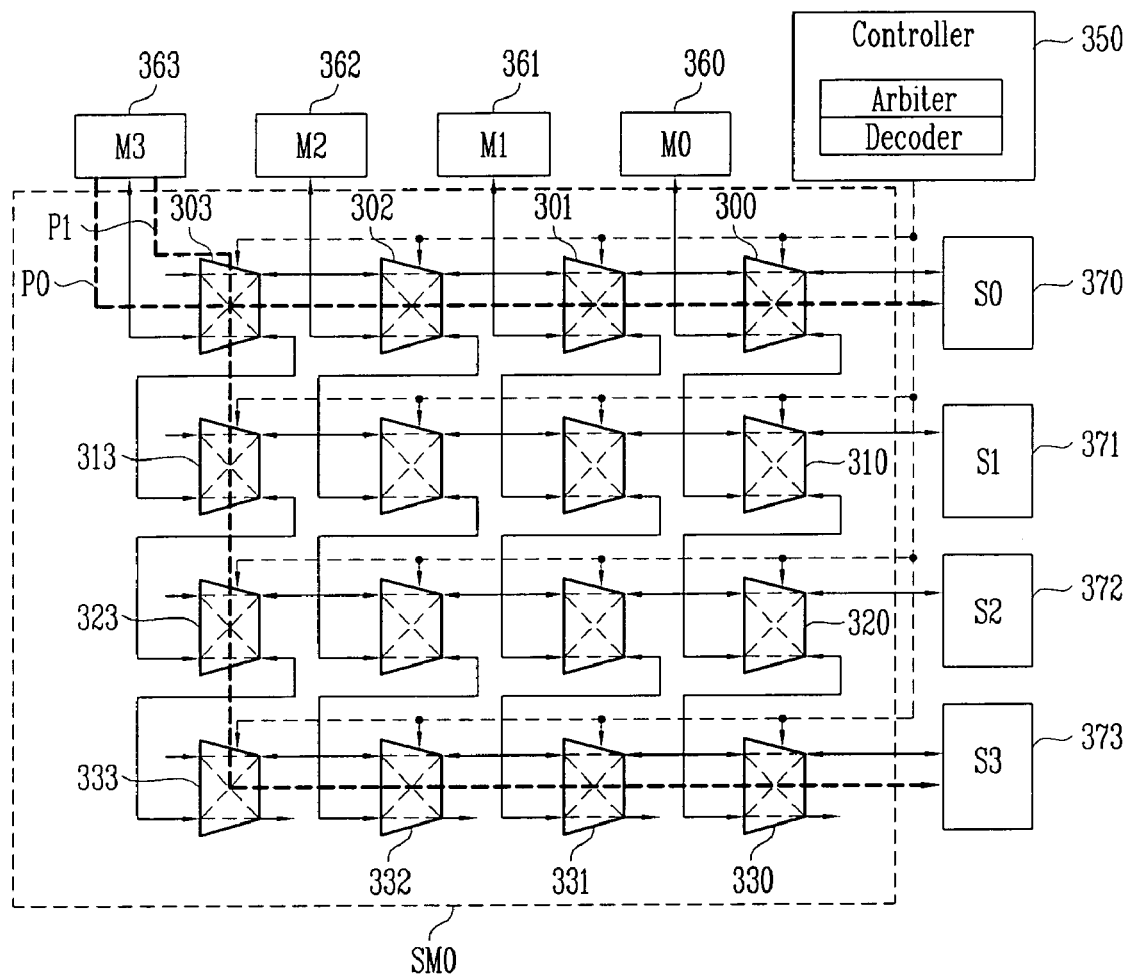
FIG. 3A is a block diagram of a multi-processor SoC platform constructed in a matrix-form crossbar switch architecture which is easily expanded according to an exemplary embodiment of the present invention.

FIG. 3A illustrates a multi-processor system-on-a-chip (SoC) platform employing a matrix-form crossbar switch architecture using 2×2 multiplexers and suggested as a solution to the problem of the control structure of FIG. 2 being complicated and difficult to be expanded. A switch matrix SM0 of the illustrated embodiment is designed to maximize expandability and connects masters with slaves using 2×2 multiplexers.

As illustrated in FIG. 3A, in this embodiment, the switch matrix SM0 comprises 2×2 multiplexers having a connection structure in a matrix form consisting of rows and columns. Here, each 2×2 multiplexer has one input line connected with an output line of a multiplexer at a front column of the same row, and the other input line connected with an output line of a multiplexer at a front row of the same column or an input/output line of a column including the corresponding multiplexer. In addition, an output line of each multiplexer 300, 310, 320 and 330 at the last column of each row is connected with an input/output line of the row.

Input/output lines connected with the output lines of the right-end 2×2 multiplexers 300, 310, 320 and 330 of the matrix rows including 2×2 multiplexers are connected with slave devices 370, 371, 372 and 373, respectively. In addition, input/output lines connected with input lines of the upper-end 2×2 multiplexers 300, 301, 302 and 303 of the matrix columns including 2×2 multiplexers are connected with master devices 360, 361, 362 and 363, respectively.

Figure 3B:
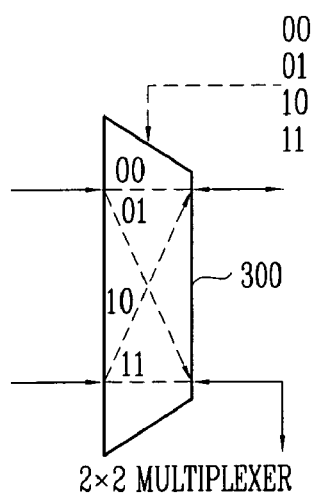
FIG. 3B is a structural diagram illustrating operation of a multiplexer included in a switch matrix of FIG. 3A.

As illustrated in FIG. 3B, the 2×2 multiplexer 300 included in the switch matrix SM0 has a structure determining a data transfer direction of a column or row by a control bit for the 2×2 multiplexer when input data is received from the column or row. The 2×2 multiplexer 300 selects one of four switching paths, which can be formed between two input lines and two output lines, according to the control bit, and can send the input data to the column or row according to the selection.

Using a connection path combination of the 2×2 multiplexers, it is possible to connect a data path along a row and a column connecting a master with a slave. A transfer path P0 through which the master M3 363 sends data to the slave S0 370 is formed by four 2×2 multiplexers 303 to 300 of the first row. In addition, a transfer path P1 through which the master M3 363 sends data to the slave S3 373 is formed by 7 2×2 multiplexers 303, 313, 323, and 333 to 330.

In response to increase in the number of masters or slaves, 2×2 multiplexers can be added in this architecture. Thus, the architecture has the advantages of expandability and also a simple control structure. In FIG. 3A, in response to increase in the number of masters, four 2×2 multiplexers are added to the four 2×2 multiplexers 303, 313, 323 and 333 of the most outer column without changing the structure of the multiplexers, so that the architecture can be expanded. In the same manner, in response to increase in the number of slaves, four 2×2 multiplexers are added to the four 2×2 multiplexers 333 to 330 of the most outer row, so that the architecture can be expanded.

However, when M3 363 sends data to S3 373, the data must pass through 7 2×2 multiplexers, and thus transmission is delayed. In addition, since the illustrated switch structure has a large difference between the shortest data transfer path and the longest data transfer path, overall system performance may vary according to how a function is embodied.

Nevertheless, the matrix-form crossbar switch architecture of this embodiment has the advantage of being very easily expanded. Since 2×2 multiplexers that are added in either the column direction or the row direction are connected to input/output lines that 2×2 multiplexers of a front stage have not used, their additional connection causes little additional load.

A switching controller 350 interprets an input command, determines a master (processing unit) and slave (peripheral) required for a process according to the command, and generates control signals respectively for the 2×2 multiplexers included in the switch matrix so as to form a data transfer path between a master and slave needing to be connected with each other. In addition, the switching controller 350 handles functions of an arbiter for mediating requests of masters and an address decoder for connecting a master with a slave.

Second Exemplary Embodiment

As described above, the crossbar switch architecture of the first embodiment has drawbacks in that data transfer may undergo delay according to a formed path, and the amount of data transfer delay varies with the formed path.

An improved matrix-form crossbar switch architecture for embodying a multi-processor SoC platform suggested in a second exemplary embodiment is aimed at allowing high-speed data transfer while having excellent expandability and eliminating data transfer delay deviation between formed paths.

Figure 4A:
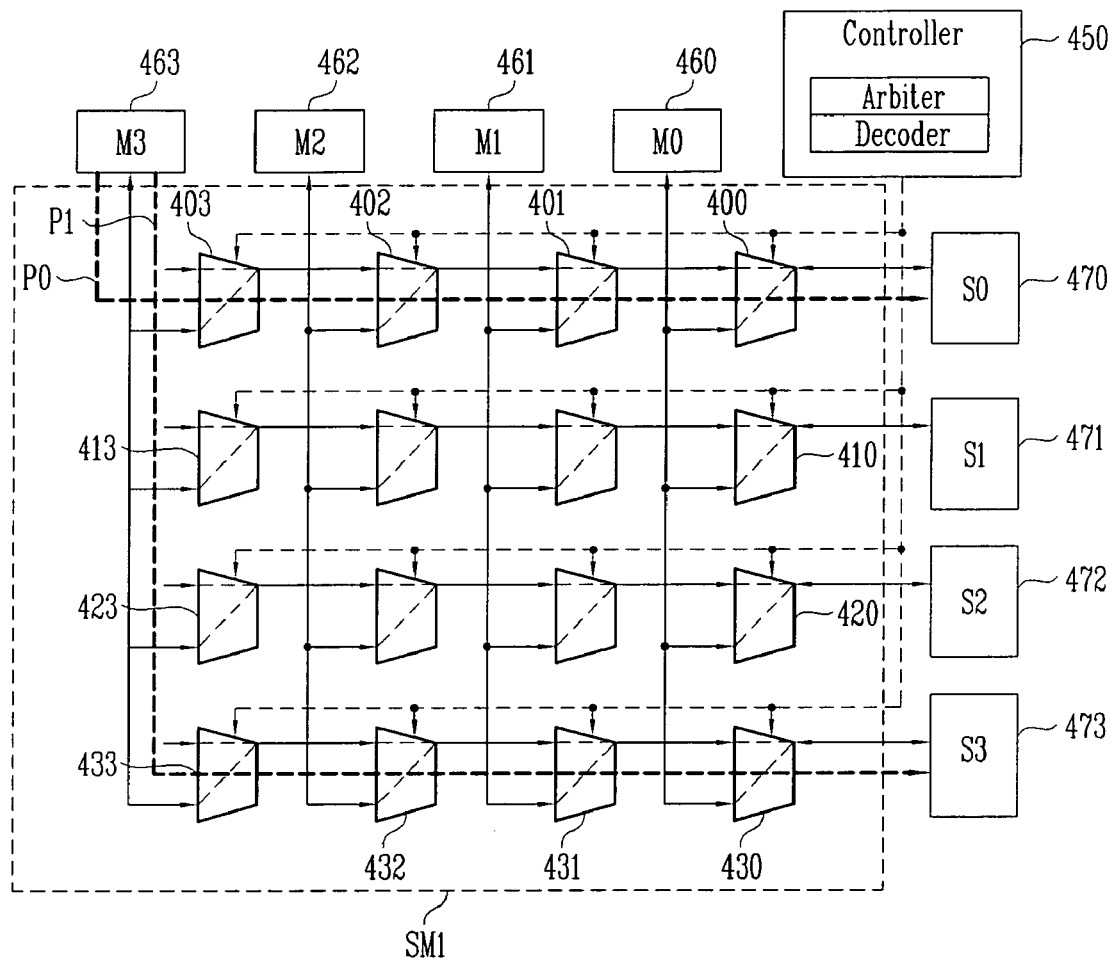
FIG. 4A is a block diagram of a multi-processor SoC platform constructed in a matrix-form crossbar switch architecture which is easily expanded and capable of high-speed data transfer according to another exemplary embodiment of the present invention.

As illustrated in FIG. 4A, in this embodiment, a crossbar switch comprises 2×1 multiplexers having a connection structure in a matrix form consisting of rows and columns. Here, each 2×1 multiplexer has one input line connected with an output line of a multiplexer at a front column of the same row, and the other input line connected with an output line of an input/output line of a column including the corresponding multiplexer. In addition, an output line of each multiplexer at the last column of each row is connected with an input/output line of the row.

Input/output lines connected with the output lines of right-end 2×1 multiplexers 400, 410, 420 and 430 of matrix rows including 2×1 multiplexers are connected with slave devices 470, 471, 472 and 473, respectively. In addition, input/output lines of matrix columns including 2×1 multiplexers are connected with master devices 460, 461, 462 and 463, respectively.

Figure 4B:
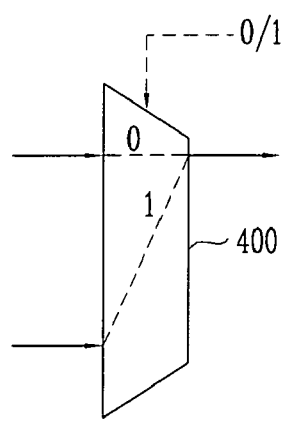
FIG. 4B is a structural diagram illustrating operation of a multiplexer included in a switch matrix of FIG. 4A.

As illustrated in FIG. 4B, the 2×1 multiplexer 400 included in the switch matrix has a structure determining a data transfer direction of a row or column by a control bit for the 2×1 multiplexer when input data is received from the row or column. The 2×1 multiplexer 400 selects one of two switching paths, which can be formed between two input lines and one output line, according to the control bit.

FIG. 4A illustrates a multi-processor SoC platform employing the matrix-form crossbar switch architecture comprising 2×1 multiplexers according to this embodiment. Each 2×1 multiplexer selects one of an input/output line of a master and an output line of a front stage (left column in the drawing) according to a control bit of 1 bit, forms one switching path toward its output line, and transfers data from a row or column along the switching path. Therefore, it can be seen that all data transfers from the masters 460 to 463 to the slaves 470 to 473 and from the slaves 470 to 473 to the masters 460 to 463 are performed in row direction only through four 2×1 multiplexers forming one row.

For example, a path P0 formed when data is transferred from the master M3 463 to the slave S0 470 includes four 2×1 multiplexers 403 to 400 of the first row. In addition, a transfer path P1 formed when data is transferred from the master M3 463 to the slave S3 473 includes four 2×1 multiplexers 433 to 430 of the fourth row. Thus, in this architecture, all the masters can transfer data to a slave through four multiplexers. A master device or a slave device can be added by connecting 2×1 multiplexers to a column or a row as described in the first embodiment, so that the number of master devices or slave devices can be increased.

In addition, the crossbar switch architecture uses 2×1 multiplexers and thus has a simple control structure capable of controlling a transfer path by the control bit of 1 bit. The architecture overcomes restrictions on data transfer path and control structure complexity while having sufficient expandability as FIG. 3A. In comparison with the architecture of the first embodiment, for example, slave input/output lines must be respectively connected to 2×1 multiplexers of the first column added when a master is added. Thus, the architecture is not as easily expanded as the first embodiment but has the advantages of a unit multiplexer included in the matrix having a simple structure, a transfer rate being high, and there being no delay time deviation between paths formed from one master.

A switching controller 450 interprets an input command, determines a master (processing unit) and slave (peripheral) required for a process according to the command, and generates control signals respectively for the 2×1 multiplexers included in the crossbar switch so as to form a data transfer path between a master and slave needing to be connected with each other. In addition, the switching controller 450 handles functions of an arbiter for mediating requests of masters and an address decoder for connecting a master with a slave.

Third Exemplary Embodiment

Figure 5:
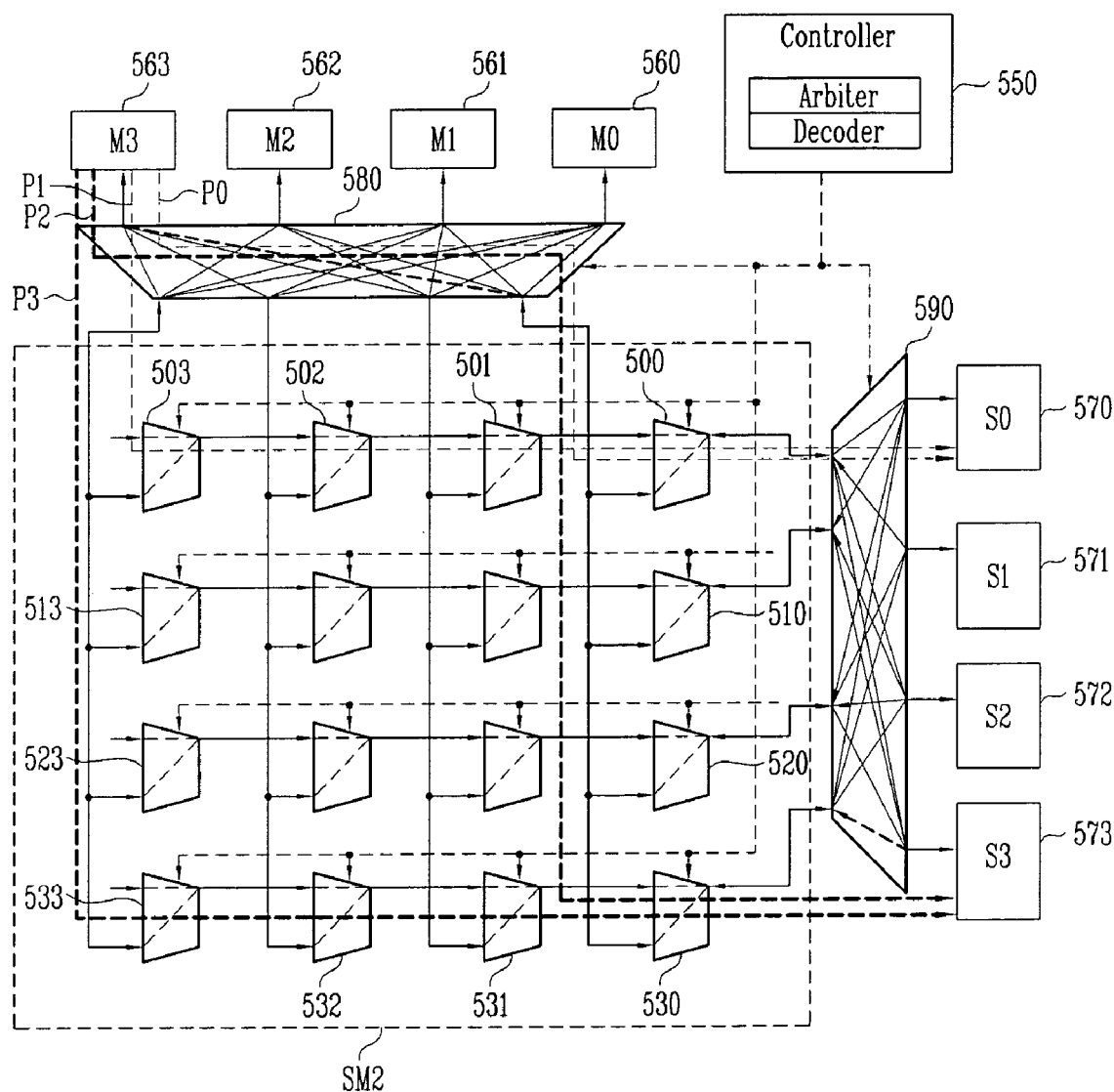
FIG. 5 is a block diagram of a multi-processor SoC platform comprising the switch matrix of FIG. 4A, a single master-group multiplexer, and a single slave-group multiplexer.

FIG. 5 illustrates a matrix-form crossbar switch architecture used in a multi-processor SoC platform of a third exemplary embodiment. In the architecture, a structure in which multiplexers capable of adjusting a data transfer path are connected with input/output terminals of masters and slaves is combined with the switch matrix illustrated in FIG. 4A, comprises 2×1 multiplexers illustrated in FIG. 4B, can be easily expanded, and has a simple control structure.

In the architecture illustrated in FIG. 4A, 2×1 multiplexers are included in the switch matrix, an M×C multiplexer (M: the number of masters, C: the number of matrix columns including 2×1 multiplexers) is connected to master ends, and an N×R multiplexer (N: the number of slaves, R: the number of matrix rows including of 2×1 multiplexers) is connected to slave ends.

The matrix-form crossbar switch architecture comprising 2×1 multiplexers is the same as the second embodiment and thus is easily expanded and can form paths capable of high-speed data transfer.

By the master-group multiplexer 580 and slave-group multiplexer 590, which are components added in this embodiment, a transfer path having characteristics appropriate to functions of each master device and an amount of data transfer can be selected.

For example, a transfer path formed when a master M3 563 sends data to a slave S0 570 is determined by the master-group multiplexer 580, the matrix comprising 2×1 multiplexers, and the slave-group multiplexer 590. Here, when transfer rate is very important for the master M3 563, the fastest path P0 passing through only one 2×1 multiplexer 500 may be selected. When transfer rate is not important in comparison with other masters, the slowest path P1 passing through four 2×1 multiplexers 503 to 500 may be selected. When the fastest path P0 is selected, the master M3 563 sends data to the slave S0 570 through one 2×1 multiplexer 500, the master-group multiplexer 580 and the slave-group multiplexer 590 only.

In the same manner, when the master M3 563 sends data to a slave S3 573, the fastest path P2 includes one 2×1 multiplexer 530, the master-group multiplexer 580 and the slave-group multiplexer 590 only, and the slowest path P3 includes four 2×1 multiplexers 533 to 530, the master-group multiplexer 580 and the slave-group multiplexer 590.

In other words, the multi-processor SoC platform of this embodiment can efficiently adjust the data transfer rate of each master as necessary in addition to the effects of the second embodiment, which include excellent expandability, a simple control structure, and a high data transfer rate obtained by using a crossbar switch comprising 2×1 multiplexers and adding a multiplexer to a row or a column when the number of masters or slaves increases.

In this embodiment, input lines of the master-group multiplexer 580 are respectively connected to the master devices 560 to 563, input lines of the slave-group multiplexer 590 are respectively connected to the slave devices 570 to 573. In addition, output lines of the master-group multiplexer 580 are respectively connected to the columns of the 2×1 multiplexer matrix, and output lines of the slave-group multiplexer 590 are respectively connected to the rows. When there are more master devices than columns of the matrix, the master-group multiplexer 580 is implemented by a multiplexer having more input lines than output lines. On the contrary, when there are fewer master devices than columns of the matrix, the master-group multiplexer 580 is implemented by a multiplexer having fewer input lines than output lines.

Here, the former case may be seen in an embodiment for increasing hardware efficiency because the number of master devices simultaneously requiring data transfer is limited when a large number of master devices are connected. And, the latter case may be seen in an embodiment having an additional transfer path so as to add a master device later on.

The same may apply to the slave-group multiplexer 590.

Meanwhile, in the matrix comprising 2×1 multiplexers, it can be seen that transfer rate varies according to selection of input/output lines of columns selectively connected with master devices, but selection of input/output lines of rows selectively connected with slave devices is not associated with transfer rate. Therefore, when there are at least as many input/output lines of rows as slaves, there is no benefit from the slave-group multiplexer 590. Consequently, it is preferable to remove the slave-group multiplexer and directly connect input/output lines of the matrix rows with the slaves 570 to 573, respectively.

While the 2×2 multiplexer of the first embodiment and the 2×1 multiplexer of this embodiment are single channel multiplexers in which only one of a plurality of switching paths that can be formed according to a control bit is formed, the master-group multiplexer 580 and the slave-group multiplexer 590 are preferably multi-channel multiplexers in which as many switching paths are formed as there are input lines or output lines according to a control bit.

In the illustrated structure, although the matrix-form crossbar switch comprising the 2×1 multiplexers of the second embodiment is used, a matrix comprising the 2×2 multiplexers of the first embodiment can also be applied. The detailed constitution and function of the matrix can be easily derived from the description of the first embodiment and thus will not be described again here.

FIG. 7 illustrates a flowchart of a process for each master to transfer data to a slave in the crossbar switch architecture of this illustrated embodiment. In step 700, each master sends a request for transferring data to a slave to a switching controller. After receiving the request signals, the switching controller sends a data transfer possible signal to a requesting master when there are no other requests for data transfer to the same slave. On the contrary, when requests for data transfer to the same slave are received in step 710, the switching controller determines, according to a priority scheduling method such as a round robin method, a master for data transfer in step 720. The determined master transfers data to the slave through the crossbar switch, and a non-determined master stands by.

In step 730, the master permitted to transfer data checks whether or not the shortest path is assigned according to a transfer characteristic of the switching controller. When it is determined that the shortest path is assigned, the master sends a shortest path control signal to the master-group multiplexer to transfer data along the shortest path in step 740. On the contrary, when the shortest path is not assigned, data is transferred along a path determined by the controller.

In step 750, a path to the slave in the switch matrix is assigned by a slave address decoder of the switching controller. In step 770, the slave-group multiplexer also selects a transfer path by the switching controller. Data is transferred between the master device and the slave device along the selected master-group multiplexer path, the switch matrix path, and a slave-group multiplexer path, until finished, in step 780.

Fourth Exemplary Embodiment

Figure 6:
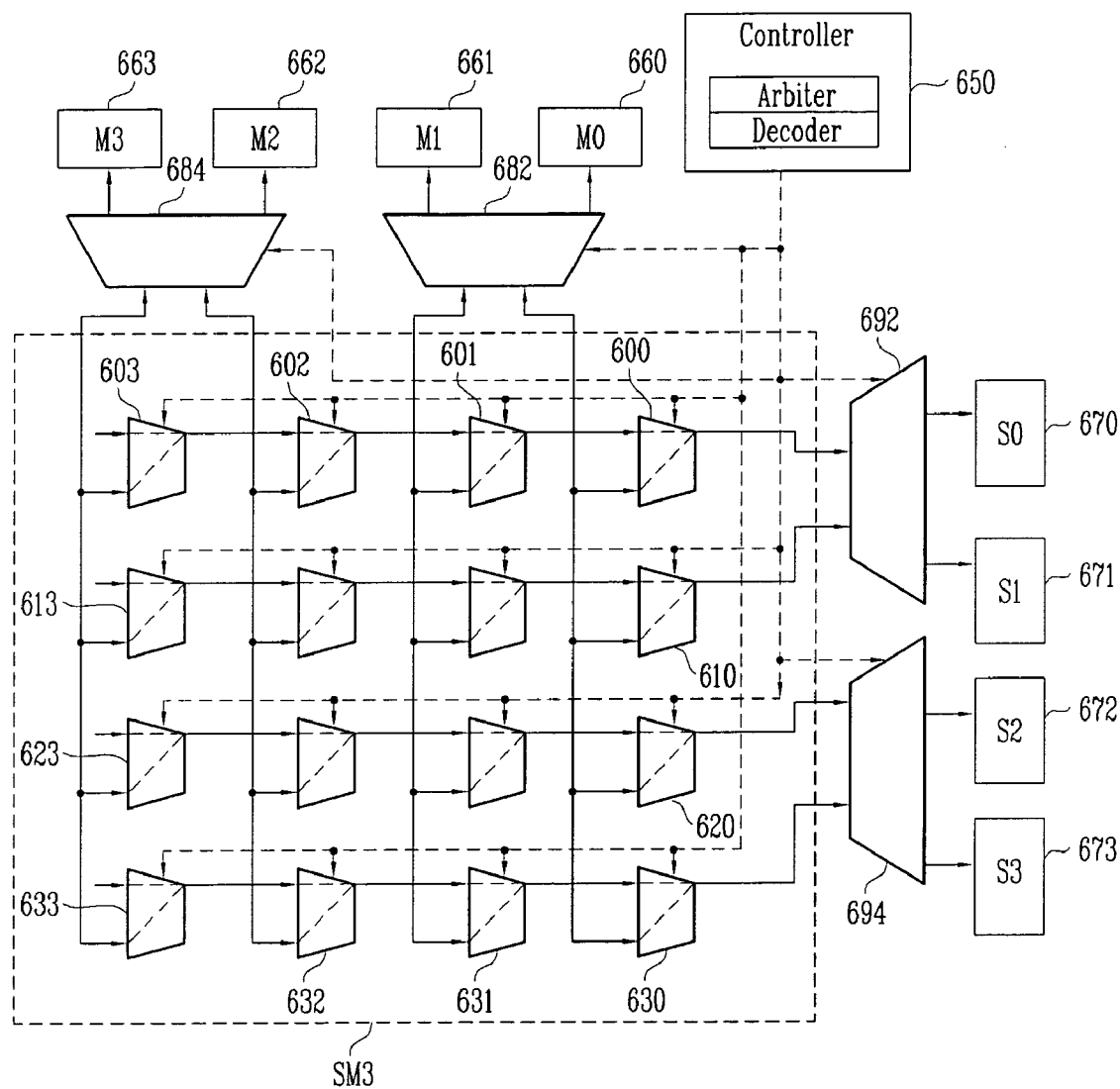
FIG. 6 is a block diagram of a multi-processor SoC platform comprising the switch matrix of FIG. 4A, a plurality of master-group multiplexers, and a plurality of slave-group multiplexers.

A crossbar switch architecture of a fourth embodiment illustrated in FIG. 6 divides the master-group multiplexer and slave-group multiplexer implemented by single multiplexers in FIG. 5 into various forms and employs them. Thus, the crossbar switch architecture is a compromise between the convenience of a crossbar switch architecture control method and expandability of the architecture.

For example, in the illustrated architecture, processing units M0 and M1 connected to a first master-group multiplexer 682 always form a relatively fast transfer path, and processing units M2 and M3 connected to a second master-group multiplexer 684 always form a relatively slow transfer path. Therefore, processing units that require faster transfer rate or are indispensable for the initial design of a SoC platform may be connected to the first master-group multiplexer 682, and processing units that do not require high transfer rate or are added for SoC platform design may be connected to the second master-group multiplexer 684.

Meanwhile, selection of a slave device and an input/output line of switch matrix columns does not affect transfer rate. Therefore, a plurality of illustrated slave-group multiplexers provides an advantage only in that slave devices can be classified and connected according to their kind.

As described above, the SoC platform employing the crossbar switch architecture of this embodiment connects multiplexers of various forms thereto according to a transfer characteristic and the number of masters or slaves, allows data transfer in various forms, and thus can satisfy demand for flexibility and expandability of a multi-processor SoC platform.

The crossbar switch architecture of the present invention as described above can be easily changed by adding a master device or slave device thereto, thus having excellent expandability.

In addition, the crossbar switch architecture of the present invention is capable of high-speed data transfer while having a sufficient level of expandability.

In addition, the crossbar switch architecture of the present invention does not require a buffer for real-time transfer but is capable of parallel data transfer along the shortest transfer path, thus reducing data delay and improving overall system performance.

In addition, the crossbar switch architecture of the present invention enables flexible connection between various master devices and slave devices and/or various formations of a transfer path selection structure.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A crossbar switch architecture comprising:
   2×1 multiplexers connected in at least a 2×2 matrix form consisting of rows and columns,
   wherein the 2×1 multiplexers each have one input line connected with an output line of a multiplexer at a front column of the same row, the other input line connected with an input/output line of a column including the corresponding multiplexer wherein the input/output line of the column including the corresponding multiplexer is connected to an input of each 2×1 multiplexer of the column including the corresponding multiplexer, and an output line of a multiplexer at the last column of each row is connected with an input/output line of the row,
   wherein input/output lines of the rows are respectively connected with output lines of one slave-group multiplexer, and input lines of the slave-group multiplexer are respectively connected with slaves.

2. The crossbar switch architecture of claim 1, wherein input/output lines of the rows are respectively connected with slaves, and input/output lines of the columns are respectively connected with masters.

3. The crossbar switch architecture of claim 2, wherein the masters are processing units, and the slaves are peripheral interfaces.

4. The crossbar switch architecture of claim 1, further comprising a switching controller for determining a connection path of each of the 2×1 multiplexers according to interpretation of an input command.

5. The crossbar switch architecture of claim 1, wherein input/output lines of the rows are connected with each output line of at least two slave-group multiplexers, and input lines of the slave-group multiplexers are respectively connected with slaves.

6. The crossbar switch architecture of claim 5, wherein the slave-group multiplexers comprise a plurality of 22 multiplexers having input lines connected with two of the input/output lines of the rows and output lines connected with two of the slaves.

7. The crossbar switch architecture of claim 1, wherein input/output lines of the columns are respectively connected with output lines of one master-group multiplexer, and input lines of the master-group multiplexer are respectively connected with masters.

8. The crossbar switch architecture of claim 1, wherein input/output lines of the columns are connected with each output line of at least two master-group multiplexers, and input lines of the master-group multiplexers are respectively connected with masters.

9. The crossbar switch architecture of claim 8, wherein the master-group multiplexers comprise a plurality of 2×2 multiplexers having input lines connected with two of the input/output lines of the columns and output lines connected with two of the masters.

* * * * *